(12) United States Patent
Hart et al.

(10) Patent No.: US 8,939,863 B2
(45) Date of Patent: Jan. 27, 2015

(54) MULTI-SPEED TRANSMISSION WITH A SERIES DISCONNECT CLUTCH

(71) Applicant: GM Global Technology Operations LLC, Detroit, MI (US)

(72) Inventors: James M. Hart, Belleville, MI (US); Daryl A. Wilton, Macomb, MI (US); James B. Borgerson, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/782,663

(22) Filed: Mar. 1, 2013

(65) Prior Publication Data

US 2014/0248989 A1 Sep. 4, 2014

(51) Int. Cl.
*F16H 3/62* (2006.01)
(52) U.S. Cl.
CPC ........................................ *F16H 3/62* (2013.01)
USPC ......................................................... 475/276

(58) Field of Classification Search
None
See application file for complete search history.

(56) References Cited

U.S. PATENT DOCUMENTS

| | | | |
|---|---|---|---|
| 7,651,431 B2 * | 1/2010 | Phillips et al. | 475/282 |
| 8,152,682 B2 * | 4/2012 | Swales et al. | 475/275 |
| 8,292,012 B2 * | 10/2012 | Sowul et al. | 180/65.265 |

* cited by examiner

*Primary Examiner* — Robert A Siconolfi
*Assistant Examiner* — Huan Le

(57) ABSTRACT

A transmission is provided having an input member, an output member, a plurality of planetary gear sets, a plurality of coupling members and a plurality of torque transmitting devices. One of the plurality of torque transmitting devices is an integrated friction launch clutch. A disconnect clutch is in series relationship with the launch clutch and is configured to disconnect the launch clutch from at least one of the plurality of planetary gear sets. The torque transmitting devices include clutches and brakes actuatable in combinations of two to establish at least ten forward gear ratios and one reverse gear ratio.

20 Claims, 3 Drawing Sheets

| Gear State | Gear Ratio | Ratio Step | Torque Transmitting Devices |||||||
|---|---|---|---|---|---|---|---|---|---|
| | | | 32 | 30 | 34 | 36 | 28 | 26 | 60 |
| Rev | -2.870 | | X | | | | | X | X |
| N | | -0.64 | | | | | | | |
| 1st | 4.455 | | X | | X | | | | X |
| 2nd | 2.912 | 1.53 | | X | X | | | | |
| 3rd | 1.894 | 1.54 | | | X | | | X | |
| 4th | 1.446 | 1.31 | | | X | | X | | |
| 5th | 1.000 | 1.45 | | | | | X | X | |
| 6th | 0.851 | 1.18 | X | | | X | | | X |
| 7th | 0.742 | 1.15 | | X | | | X | | |
| 8th | 0.609 | 1.22 | | | | X | X | | |
| 9th | 0.556 | 1.09 | | X | | X | | | |
| 10th | 0.505 | 1.10 | | | | X | | X | |

*Fig-4*

MULTI-SPEED TRANSMISSION WITH A SERIES DISCONNECT CLUTCH

FIELD

The invention relates generally to a multiple speed transmission having a plurality of planetary gear sets and a plurality of torque transmitting devices with a series disconnect clutch. More particularly the invention relates to a transmission having a disconnect clutch in series relationship with an integrated friction launch device.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided that includes an input member, an output member, and first, second, third and fourth planetary gear sets each having first, second and third members. A first interconnecting member continuously interconnects the first member of the first planetary gear set with the second member of the second planetary gear set. A second interconnecting member continuously interconnects the second member of the first planetary gear set with the third member of the third planetary gear set. A third interconnecting member continuously interconnects the third member of the first planetary gear set with the third member of the fourth planetary gear set. A fourth interconnecting member continuously interconnects the first member of the second planetary gear set with the second member of the fourth planetary gear set. A fifth interconnecting member continuously interconnects the third member of the second planetary gear set with the second member of the third planetary gear set. The transmission also includes six torque transmitting mechanisms each selectively engageable to interconnect at least one of the first, second, and third members with at least one other of the first, second, third members and a stationary member, wherein one of the six torque transmitting mechanisms is a launch device engaged in first gear and reverse gear. A disconnect clutch is in series relationship with the launch device and is configured to connect the launch device with one of the first, second, and third members when the launch device is engaged and is configured to disconnect the launch device from one of the first, second, and third members when the launch device is disengaged. The six torque transmitting mechanisms are selectively engageable in combinations of at least two to establish at least ten forward speed ratios and at least one reverse speed ratio between the input member and the output member second member of the third planetary gear set and the third member of the second planetary gear set In one embodiment a first of the six torque transmitting mechanisms is selectively engageable to interconnect the first member of the third planetary gear set with the input member, the first member of the second planetary gear set and the second member of the fourth planetary gear set.

In another embodiment a second of the six torque transmitting mechanisms is selectively engageable to interconnect the third member of the second planetary gear set and the second member of the third planetary gear set with the input member, the first member of the second planetary gear set and the second member of the fourth planetary gear set.

In yet another embodiment a third of the six torque transmitting mechanisms is selectively engageable to interconnect the first member of the third planetary gear set with the stationary member.

In yet another embodiment a fourth of the six torque transmitting mechanisms is selectively engageable to interconnect the disconnect clutch with the stationary member.

In yet another embodiment a fifth of the six torque transmitting mechanisms is selectively engageable to interconnect the third member of the first planetary gear set and the third member of the fourth planetary gear set with the stationary member.

In yet another embodiment a sixth of the six torque transmitting mechanisms is selectively engageable to interconnect the first member of the fourth planetary gear set with the stationary member.

In yet another embodiment the fourth torque transmitting mechanism is the launch device.

In yet another embodiment the input member is continuously connected for common rotation with the first member of the second planetary gear set and the second member of the fourth planetary gear set and wherein the input member is not connected to a hydrodynamic starting device.

In yet another embodiment the output member is continuously connected for common rotation with the second member of the first planetary gear set and to third member of the third planetary gear set.

In yet another embodiment the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 4 is a truth table presenting the state of engagement of the various torque transmitting devices in each of the available forward and reverse speeds or gear ratios of the transmissions illustrated in FIGS. 1 and 3.

DETAILED DESCRIPTION

The following description is merely exemplary in nature and is not intended to limit the present disclosure, application, or uses.

Figure 1:
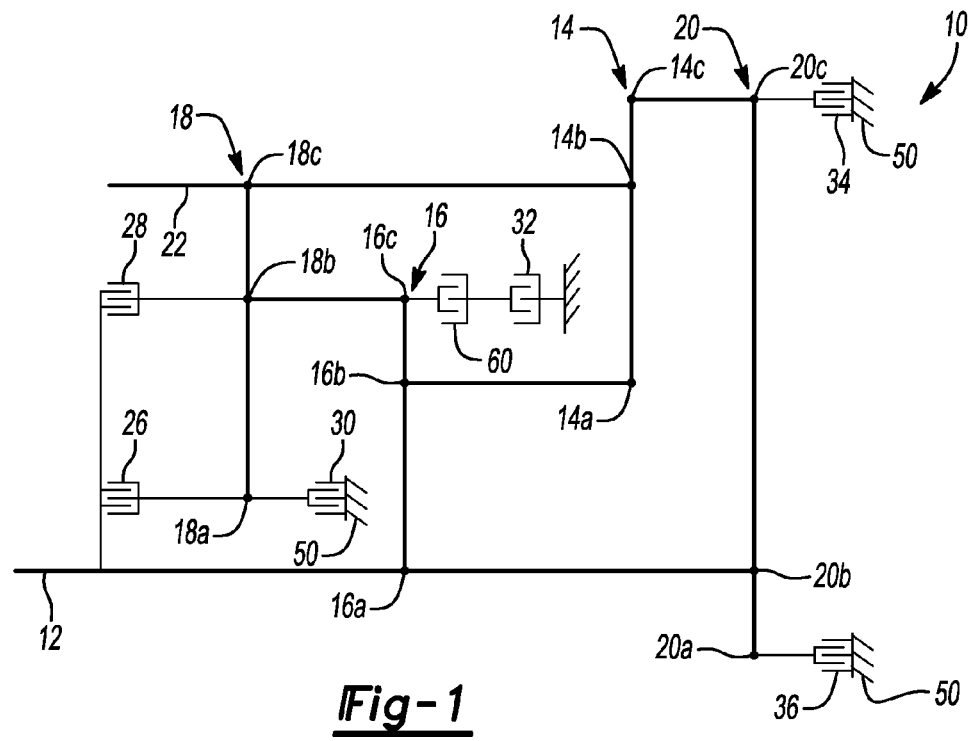
FIG. 1 is a lever diagram of an embodiment of an exemplary ten speed transmission according to the principles of the present invention.

Referring now to FIG. 1, an embodiment of a transmission 10 having an integrated friction launch device with a series disconnect clutch is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the second node 20B of the fourth planetary gear set 20. The output member 22 is coupled to the third node 18C of the third planetary gear set 18 and the second node 14B of the first planetary gear set 14. The first node 14A of the first planetary gear set 14 is coupled to the second node 16B of the second planetary gear set 16. The third node 14C of the first planetary gear set 14 is coupled to the third node 20C of the fourth planetary gear set 20. The third node 16C of the second planetary gear set 16 is coupled to second node 18B of the third planetary gear set 18.

A first clutch 26 selectively connects the input member or shaft 12, the first node 16A of the second planetary gear set 16 and the second node 20B of the fourth planetary gear set 20 with the first node 18A of the third planetary gear set 18. A second clutch 28 selectively connects the input member or shaft 12, the first node 16A of the second planetary gear set 16 and the second node 20B of the fourth planetary gear set 20 with the second node 18B of the third planetary gear set 18. A first brake 30 selectively connects the first node 18A of the third planetary gear set 18 with a stationary member or transmission housing 50. A second brake 32 selectively connects a disconnect clutch 60 with the stationary member or transmission housing 50. A third brake 34 selectively connects the third node 14C of the first planetary gear set 14 and the third node 20C of the fourth planetary gear set 20 with the stationary member or transmission housing 50. A fourth brake 36 selectively connects the first node 20A of the fourth planetary gear set 20 with the stationary member or transmission housing 50.

One of the plurality of clutches 26, 28 and brakes 30, 32, 34, and 36 is configured as a launch clutch. In the transmission example provided, the second brake 32 is preferably selected as the launch clutch. The launch clutch 32 may be modified to increase durability, size, etc., in order to function as a friction launch clutch. The friction launch clutch 32 allows the input 12 to be connected directly (i.e. not through a starting device such as a torque converter) to the output of the engine. When starting the vehicle from rest in first gear the launch clutch 32 is allowed to slip (by not being fully engaged). To launch the vehicle the launch clutch 32 is fully engaged. When the vehicle is at rest and shifted into reverse the launch clutch 32 is allowed to slip until the launch clutch 32 is fully engaged and the vehicle is launched in reverse.

Due to the larger size of the launch device 32, the spin losses associated with the launch device 32 are relatively higher than the spin losses associated with the other torque transmitting devices. Therefore, the disconnect clutch 60 is in operative association with the launch clutch 32. The disconnect clutch 60 is disposed between the launch clutch 32 and the third node 16C of the second planetary gear set 16 and the second node 18B of the third planetary gear set 18. The disconnect clutch 60 is fully engaged when the launch clutch 32 is at least partially engaged. The disconnect clutch 60 is preferably configured as having high compressive loading plates or discs with relatively small swept or contact areas. The disconnect clutch 60 disconnects the launch clutch 32 from the rotating components of the transmission 10 when the launch clutch 32 is not engaged. Therefore, the disconnect clutch 60 eliminates or greatly reduces the spin losses associated with the launch clutch 32.

Figure 2:
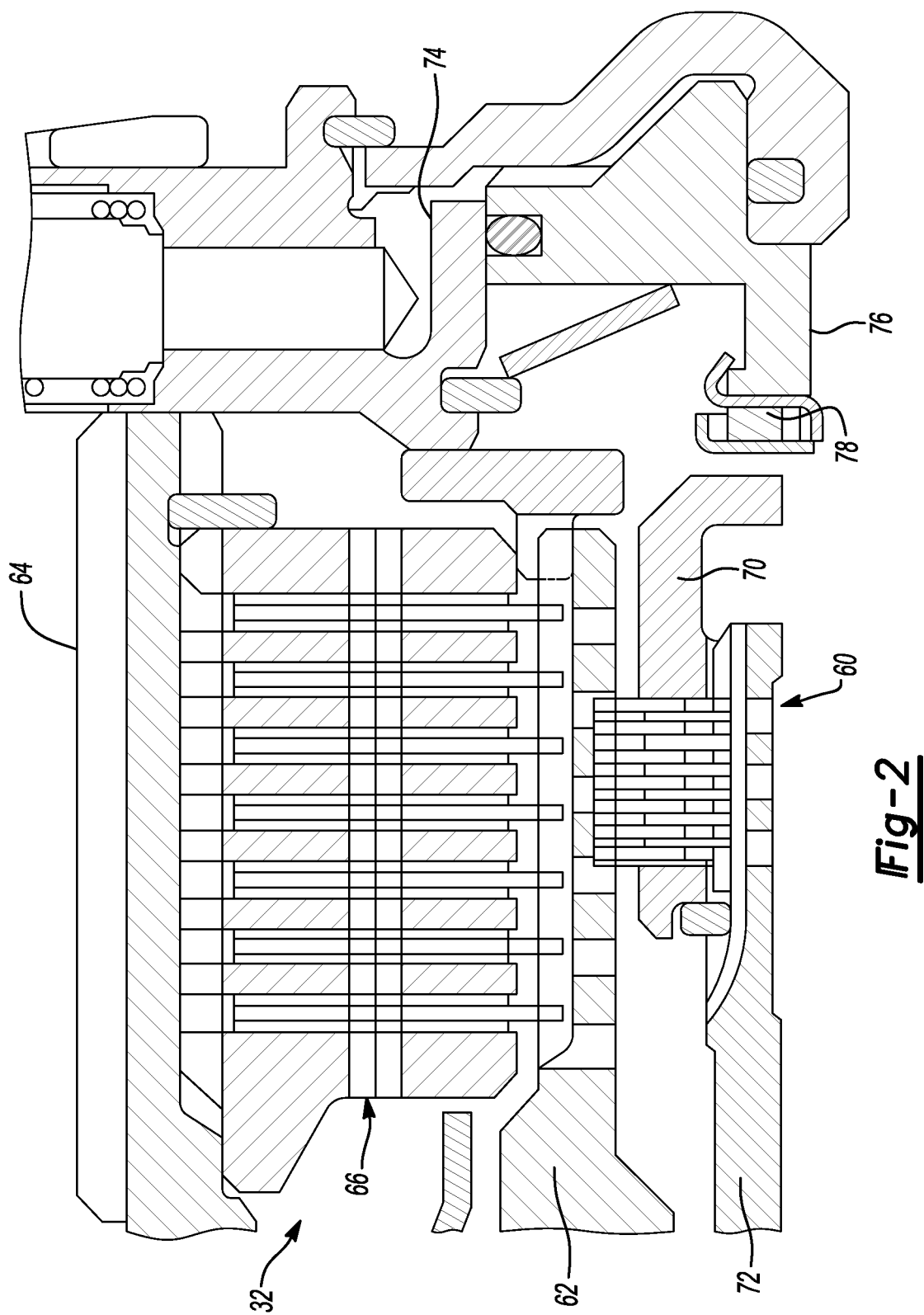
FIG. 2 is a cross-section of a friction launch clutch and series disconnect clutch according to the principles of the present invention.

The disconnect clutch 60 may be integrated with the launch clutch 32 in various ways without departing from the scope of the present invention. FIG. 2 presents an exemplary configuration illustrating the disconnect clutch 60 integrated with the launch clutch 32. The launch clutch 32 includes a selectable hub 62 and a housing 64. A clutch pack 66 is disposed between the selectable hub 62 and the housing 64. The clutch pack 66 includes interleaved discs and plates associated with the selectable hub 62 and the housing 64. For example, the clutch pack 66 may include annular shaped friction plates having friction material disposed on one or both sides of a core plate interleaved with annular shaped separator plates. When engaged the clutch pack 66 rotationally couples the selectable hub 62 with the housing 64.

The disconnect clutch 60 includes a clutch pack 68 connected between the selectable hub 62, an apply member 70, and a shaft or interconnecting member 72. The clutch pack 68 includes interleaved discs and plates associated with the selectable hub 62 and the shaft or interconnecting member 72. For example, the clutch pack 68 may include annular shaped friction plates having friction material disposed on one or both sides of a core plate interleaved with annular shaped separator plates. The apply member 70 is configured to engage the clutch pack 68 of the disconnect clutch 60. When engaged, the clutch pack 68 rotationally couples the shaft or interconnecting member 72 with the selectable hub 62. In the example provided the shaft or interconnecting member 72 is interconnected to the third node 16C of the second planetary gear set 16.

A piston housing 74 supports an apply piston 76 therein. The apply piston 76 is hydraulically actuatable to contact the apply member 70 through an apply bearing 78. As the apply piston 76 translates, the apply member 70 engages the clutch pack 68 of the disconnect clutch 60 and rotationally connects the shaft or interconnecting member 70 with the selectable hub 62. The launch clutch 32 is then actuatable by a separate hydraulic piston system (not shown).

Figure 3:
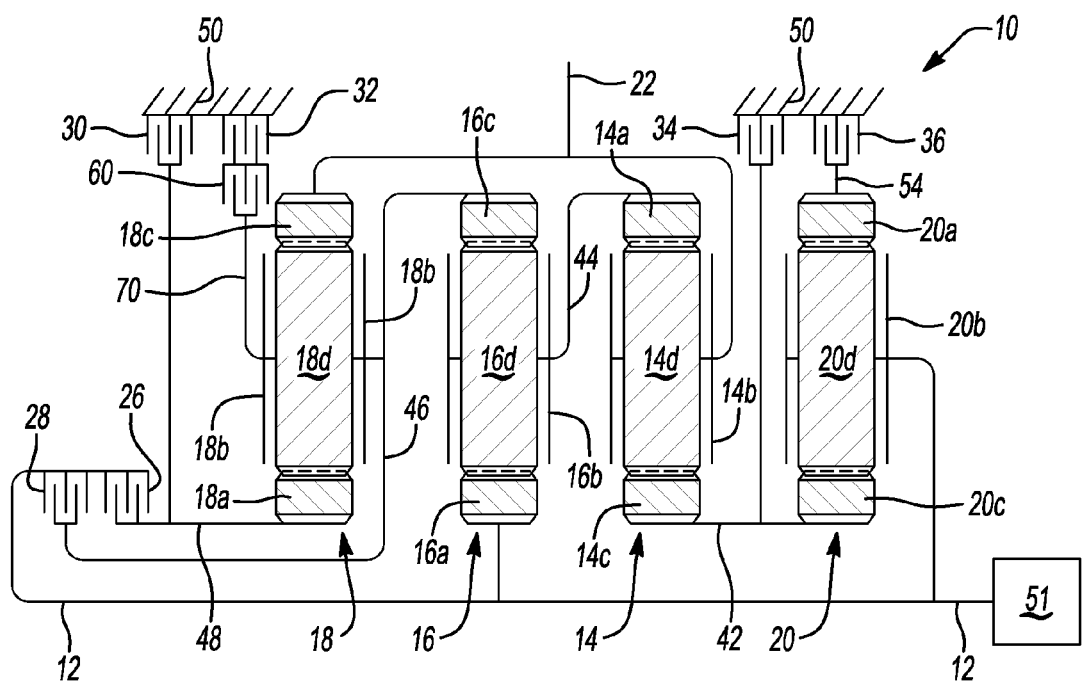
FIG. 3 is a diagrammatic illustration of an embodiment of an exemplary ten speed transmission according to the principles of the present invention.

Referring now to FIG. 3, a stick diagram presents a schematic layout of an embodiment of the ten speed transmission 10 having the launch clutch 32 and disconnect clutch 60 according to the present invention. In FIG. 3, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fourth shaft or interconnecting member 48. The ring gear member 18C is connected for common rotation with the output shaft or member 22. The planet carrier member 18B is connected for common rotation with the third shaft or interconnecting member 46 and the shaft or interconnecting member 70. The planet gears 18D are each configured to intermesh with both the sun gear member 18A and the ring gear member 18C.

The planetary gear set 20 includes a sun gear member 20C, a ring gear member 20A and a planet gear carrier member 20B that rotatably supports a set of planet gears 20D (only one of which is shown). The sun gear member 20C is connected for common rotation with the first shaft or interconnecting member 42. The ring gear member 20A is connected for common rotation with a sixth shaft or interconnecting member 54. The planet carrier member 20B is connected for common rotation with the input shaft or member 12. The planet gears 20D are each configured to intermesh with both the sun gear member 20C and the ring gear member 20A.

The input shaft or member 12 is continuously connected to an engine 51. The output shaft or member 22 is continuously connected with the final drive unit or transfer case (not shown).

The torque-transmitting mechanisms or clutches 26, 28 and brakes 30, 32, 34 and 36 allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The first brake 30 is selectively engageable to connect the fourth shaft or interconnecting member 48 with the stationary element or the transmission housing 50 in order to restrict the member 48 from rotating relative to the transmission housing 50. The second brake or launch clutch 32 is selectively engageable to connect the disconnect clutch 60 with the stationary element or the transmission housing 50. The third brake 34 is selectively engageable to connect the first shaft or interconnecting member 42 with the stationary element or the transmission housing 50 in order to restrict the member 42 from rotating relative to the transmission housing 50. The fourth brake 36 is selectively engageable to connect the sixth shaft or interconnecting member 54 with the stationary element or the transmission housing 50 in order to restrict the member 54 from rotating relative to the transmission housing 50. The disconnect clutch 60 selectively connects shaft or interconnecting member 70 with the second brake or launch clutch 32.

Referring now to FIG. 1 and FIG. 3, the operation of the embodiment of the ten speed transmission 10 will be described. It will be appreciated that transmission 10 is capable of transmitting torque from the input shaft or member 12 to the output shaft or member 22 in at ten forward speed torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake or launch clutch 32, third brake 34 and fourth brake 36), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the first clutch 26, the disconnect clutch 60, and the launch clutch 32 are engaged or activated. The first clutch 26 connects the input shaft or member 12 with the fourth shaft or interconnecting member 48. The disconnect clutch 60 connects the shaft or interconnecting member 70 with the launch clutch 32. The launch clutch 32 connects the shaft or interconnecting member 70 with the stationary element or the transmission housing 50 in order to restrict the member 70 from rotating relative to the transmission housing 50. Likewise, the ten forward ratios are achieved through different combinations of clutch and brake engagement, as shown in FIG. 4.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The following is claimed:

1. A powertrain comprising:
   an engine; and
   a transmission including:
   an input member connected to the engine;
   an output member;
   a plurality of planetary gear sets connected between the input member and the output member;
   a launch clutch connected to one of the plurality of planetary gear sets, wherein the launch clutch is configured to engage during a first gear and a reverse gear, wherein the first gear provides the largest gear ratio of any other forward gear provided by the transmission; and
   a disconnect clutch connected between the launch clutch and the one of the plurality of planetary gear sets, wherein the disconnect clutch is configured to couple the launch clutch with the one of the plurality of planetary gear sets when the launch clutch is engaged and to disconnect the launch clutch with the one of the plurality of planetary gear sets when the launch clutch is not engaged.

2. The powertrain of claim 1 wherein the launch clutch includes a housing and a hub, and wherein the disconnect clutch is connected to the hub of the launch clutch and a member connected to the one of the planetary gear sets.

3. The powertrain of claim 1 wherein the input member of the transmission is not connected to a hydrodynamic starting device disposed between the engine and the input member.

4. The powertrain of claim 1 wherein the transmission is a ten-speed transmission.

5. The powertrain of claim 4 wherein the transmission includes five torque transmitting devices, and wherein engagement of the launch clutch, the disconnect clutch, and a first of the five torque transmitting devices provides the first gear.

6. The powertrain of claim 5 wherein engagement of the launch clutch, the disconnect clutch, and a second of the five torque transmitting devices provides the reverse gear.

7. A transmission including:
   an input member;
   an output member;
   first, second, third and fourth planetary gear sets each having first, second and third members;
   a first interconnecting member continuously interconnecting the first member of the first planetary gear set with the second member of the second planetary gear set;
   a second interconnecting member continuously interconnecting the second member of the first planetary gear set with the third member of the third planetary gear set;
   a third interconnecting member continuously interconnecting the third member of the first planetary gear set with the third member of the fourth planetary gear set;
   a fourth interconnecting member continuously interconnecting the first member of the second planetary gear set with the second member of the fourth planetary gear set;
   a fifth interconnecting member continuously interconnecting the third member of the second planetary gear set with the second member of the third planetary gear set;
   six torque transmitting mechanisms each selectively engageable to interconnect at least one of the first, second, and third members with at least one other of the first, second, third members and a stationary member, wherein one of the six torque transmitting mechanisms is a launch device engaged in first gear and reverse gear; and
   a disconnect clutch in series relationship with the launch device and configured to connect the launch device with one of the first, second, and third members when the launch device is engaged and configured to disconnect the launch device from one of the first, second, and third members when the launch device is disengaged, and
   wherein the six torque transmitting mechanisms are selectively engageable in combinations of at least two to establish at least ten forward speed ratios and at least one reverse speed ratio between the input member and the output member.

8. The transmission of claim 7 wherein the input member is continuously connected for common rotation with the first member of the second planetary gear set and the second member of the fourth planetary gear set and wherein the input member is not connected to a hydrodynamic starting device.

9. The transmission of claim 7 wherein the output member is continuously connected for common rotation with the second member of the first planetary gear set and to third member of the third planetary gear set.

10. The transmission of claim 7 wherein the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

11. The transmission of claim 7 wherein a first of the six torque transmitting mechanisms is selectively engageable to interconnect the first member of the third planetary gear set with the input member, the first member of the second planetary gear set and the second member of the fourth planetary gear set.

12. The transmission of claim 11 wherein a second of the six torque transmitting mechanisms is selectively engageable to interconnect the third member of the second planetary gear set and the second member of the third planetary gear set with the input member, the first member of the second planetary gear set and the second member of the fourth planetary gear set.

13. The transmission of claim 12 wherein a third of the six torque transmitting mechanisms is selectively engageable to interconnect the first member of the third planetary gear set with the stationary member.

14. The transmission of claim 13 wherein a fourth of the six torque transmitting mechanisms is selectively engageable to interconnect the disconnect clutch with the stationary member.

15. The transmission of claim 14 wherein a fifth of the six torque transmitting mechanisms is selectively engageable to interconnect the third member of the first planetary gear set and the third member of the fourth planetary gear set with the stationary member.

16. The transmission of claim 15 wherein a sixth of the six torque transmitting mechanisms is selectively engageable to interconnect the first member of the fourth planetary gear set with the stationary member.

17. The transmission of claim 16 wherein the fourth torque transmitting mechanism is the launch device.

18. A transmission comprising:
- first, second, third and fourth planetary gear sets each having a sun gear, a carrier member and a ring gear;
- an input member continuously connected for common rotation with the sun gear of the second planetary gear set and the carrier member of the fourth planetary gear set;
- an output member continuously connected for common rotation with the carrier member of the first planetary gear set and the ring gear of the third planetary gear set;
- a first interconnecting member continuously interconnecting the ring gear of the first planetary gear set with the carrier member of the second planetary gear set;
- a second interconnecting member continuously interconnecting the carrier member of the first planetary gear set with the ring gear of the third planetary gear set;
- a third interconnecting member continuously interconnecting the sun gear of the first planetary gear set with the sun gear of the fourth planetary gear set;
- a fourth interconnecting member continuously interconnecting the sun gear of the second planetary gear set with the carrier member of the fourth planetary gear set;
- a fifth interconnecting member continuously interconnecting the ring gear of the second planetary gear set with the carrier member of the third planetary gear set;
- a first torque transmitting mechanism selectively engageable to interconnect the sun gear of the third planetary gear set with the input member, the sun gear of the second planetary gear set and the carrier member of the fourth planetary gear set;
- a second torque transmitting mechanism selectively engageable to interconnect the ring gear of the second planetary gear set and the carrier member of the third planetary gear set with the input member, the sun gear of the second planetary gear set and the carrier member of the fourth planetary gear set;
- a third torque transmitting mechanism selectively engageable to interconnect the sun gear of the third planetary gear set with the stationary member;
- a fourth torque transmitting mechanism selectively engageable to interconnect the carrier member of the third planetary gear set with the stationary member;
- a fifth torque transmitting mechanism selectively engageable to interconnect the sun gear of the first planetary gear set and the sun gear of the fourth planetary gear set with the stationary member; and
- a sixth torque transmitting mechanism selectively engageable to interconnect the ring gear of the fourth planetary gear set with the stationary member;
- a seventh torque transmitting mechanism selectively engageable to interconnect the fourth torque transmitting mechanism with the carrier member of the third planetary gear set, and
- wherein the torque transmitting mechanisms are each selectively engageable in combinations of at least two to establish at least ten forward speed ratios and at least one reverse speed ratio between the input member and the output member.

19. The transmission of claim 18 wherein the fourth torque transmitting mechanism is engaged in a first gear and a reverse gear.

20. The transmission of claim 19 wherein the seventh torque transmitting mechanism connects the fourth torque transmitting mechanism with the carrier member of the third planetary gear set when the fourth torque transmitting mechanism is engaged and disconnects the fourth torque transmitting mechanism from the carrier member of the third planetary gear set when the fourth torque transmitting mechanism is disengaged.

* * * * *